United States Patent
Alphin et al.

(10) Patent No.: US 11,657,451 B1
(45) Date of Patent: *May 23, 2023

(54) AUTOMATIC VIRTUAL PURCHASE CARD CHARGE RECONCILIATION AGAINST REQUISITION IN AN ONLINE PROCUREMENT SYSTEM

(71) Applicant: Coupa Software Incorporated, San Mateo, CA (US)

(72) Inventors: Adam Alphin, Suffolk, VA (US); Rohit Jalisatgi, San Mateo, CA (US); Rajiv Ramachandran, San Mateo, CA (US); Matt Pasquini, San Mateo, CA (US)

(73) Assignee: Coupa Software Incorporated, San Mateo, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/532,879

(22) Filed: Nov. 22, 2021

Related U.S. Application Data

(63) Continuation of application No. 16/297,332, filed on Mar. 8, 2019, now Pat. No. 11,182,849.

(60) Provisional application No. 62/667,053, filed on May 4, 2018.

(51) Int. Cl.
*G06Q 40/02* (2023.01)
*G06Q 30/0601* (2023.01)
*G06Q 20/34* (2012.01)

(52) U.S. Cl.
CPC .......... *G06Q 40/02* (2013.01); *G06Q 20/351* (2013.01); *G06Q 30/0635* (2013.01)

(58) Field of Classification Search
None
See application file for complete search history.

(56) References Cited

U.S. PATENT DOCUMENTS

| | | | |
|---|---|---|---|
| 6,941,285 B2* | 9/2005 | Sarcanin | G06Q 20/105 235/382 |
| 7,500,598 B2* | 3/2009 | Davis | G06Q 20/04 705/42 |
| 9,292,871 B2* | 3/2016 | Isaacson | G06Q 30/0641 |
| 10,580,070 B2* | 3/2020 | Keithley | G06Q 40/12 |
| 2005/0177507 A1* | 8/2005 | Bandych | G06Q 20/10 705/40 |

(Continued)

*Primary Examiner* — Bruce I Ebersman
*Assistant Examiner* — Matthew Cobb
(74) *Attorney, Agent, or Firm* — Baker Botts L.L.P.

(57) ABSTRACT

A programmed computer-implemented method allows enterprises to pay transactions using a virtual credit card at the time of an approved purchase order. The approach maintains corporate controls relating to requisitions and purchase orders, eliminates the need for electronic invoicing, and automates the accounting and reconciliation of virtual credit card charges. For example, a particular line item in a card statement, representing a particular charge event, is automatically reconciled to the correct purchase order. For another example, each charge represented in a card statement can be associated with the supplier that is identified in a corresponding PO. Therefore, a computer graphical user interface (GUI) can show vendor identification at any time, whereas most buyers are not able to see the true vendor in spend data on a credit card charge, as the vendor is typically just represented as the issuing bank.

20 Claims, 9 Drawing Sheets

(56) References Cited

U.S. PATENT DOCUMENTS

2010/0094735 A1* 4/2010 Reynolds .............. G06Q 40/02
  705/40
2010/0174556 A1* 7/2010 Wilkins .............. G06Q 20/352
  705/40
2012/0221421 A1* 8/2012 Hammad .............. G06Q 10/00
  705/16

* cited by examiner

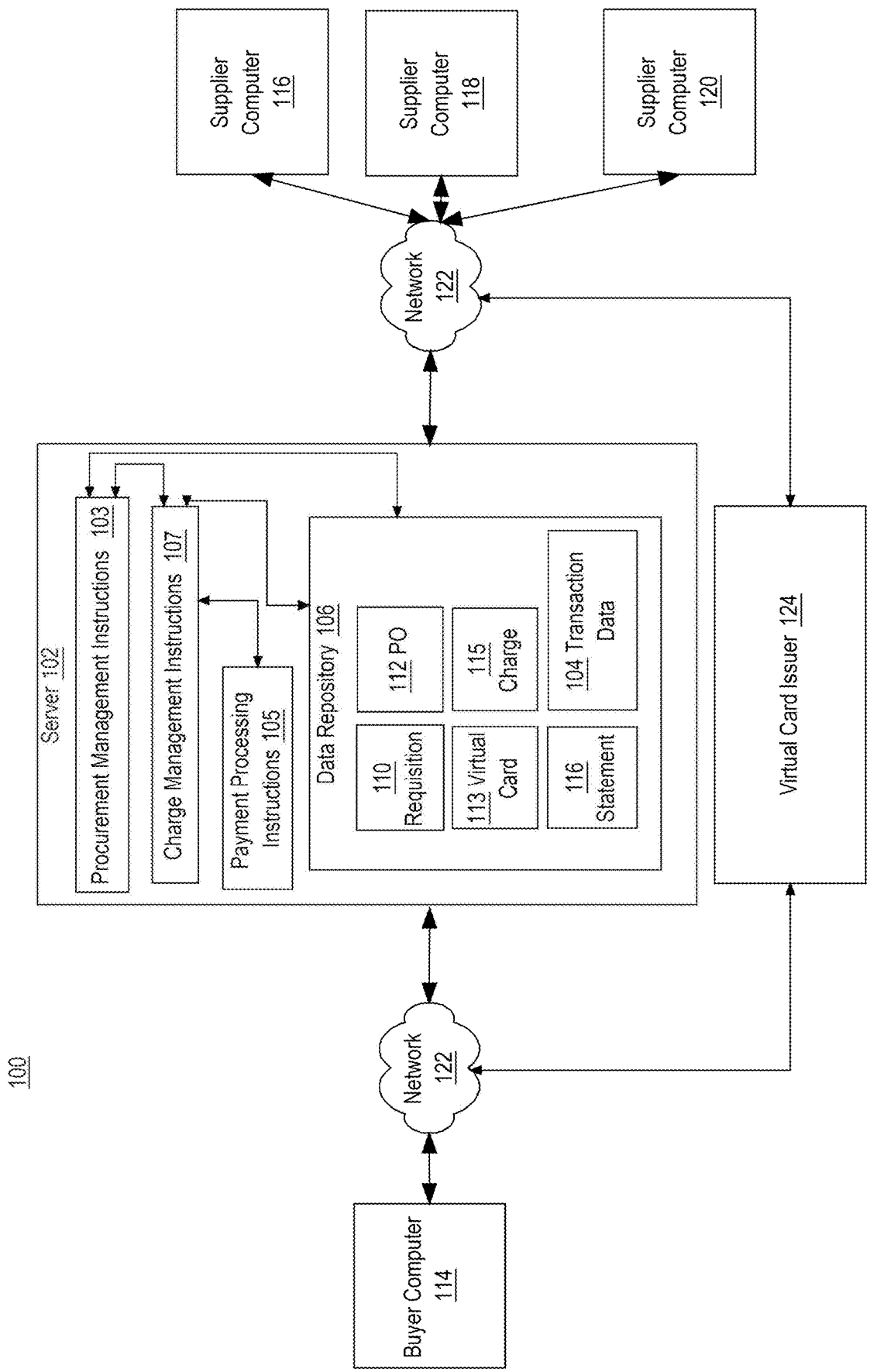

FIG. 3A

300

305
Associating, using a procurement computing device, purchase order data with virtual card data prior to transmitting the purchase order data, over a computer network, to a first external computing device

310
In response to receiving, at an end of a first periodic interval, a first information feed over the computer network, performing a first subroutine

315
In response to receiving, at an end of a second periodic interval that is longer than the first periodic interval, a second information feed over the computer network, performing a second subroutine

FIG. 3B

325
Processing, using the procurement computing device, the first information feed to generate charge data relating to a first event that occurred during the first periodic interval and that is associated with the virtual card data, and electronically storing the charge data in a digital repository accessible by the procurement computing device

330
Associating, using the procurement computing device, the charge data with the purchase order data

FIG. 3C

355
Processing, using the procurement computing device, the second information feed to generate statement data associated with at least the virtual card data

360
Associating, using the procurement computing device, a portion of the statement data representing the first event with the charge data stored in the digital repository

Purchase Order #20

*General Info* | Lines | History

General Info

Status Issued - Scheduled for email
Order Date 04/26/18
Revision Date 04/26/18
Requisition # 201
Requester Coupa Support
Ship To User Coupa Support
Department Marketing
PCard None
Exported No (change)
Service Quality Rating
Attachments None

Shipping

Address 250 Sycamore Avenue
Redwood City, CA 94025
United States
Attn: Coupa Support Terms None

Supplier

Name Test VC Supplier
Primary Address 1855 S Grant St
San Mateo, CA 94402
United States Email Opened No
Order Number None (change)

Payment

Card Type Test Conferma
Virtual Card VI ************2415
Status Sent
Issue Date 04/27/2018
Expiration Date 05/27/2018

FIG. 4

Charges

| Id | Statement Name | External Ref | Virtual Card | Order Header | Merchant Reference | Charge Date | Total | Currency | Merchant Total | Merchant Cur |
|---|---|---|---|---|---|---|---|---|---|---|
| 1 | Name (Charge 174403 name?) | 174403 | 10453177 | | 8 merchant_reference? | 05/17/18 | 178.54 USD | | 178.54 | USD |

Per page 15 | 45 | 90

FIG. 5

Virtual Card Details

Last Updated Date: 04/25/18
Name: Coupa Test
Partner: Test Conferms
Total Booked: 178.54 USD
Total Charged: 0.00 USD
Valid From: 04/17/18
Valid To: 05/17/18

| Name | External Ref | Merchant Reference | Charge Date | Amount | Currency | Merchant Amount | Merchant Currency | Supplier | Statement | Misc |
|---|---|---|---|---|---|---|---|---|---|---|
| charge name? | 174403 | merchant_reference? | 05/17/18 | 178.54 | USD | 178.54 | USD | TestVC Supplier | None | 000 |

FIG. 6

Virtual Cards

FIG. 7

| Id | Order Header Name | External Ref | Name | Total Booked | Total Charged | Currency | Credit Account | Valid To | Actions |
|---|---|---|---|---|---|---|---|---|---|
| 2 | 4 Test Conforma | 10455175 | Coupa Test | 9.99 | 0.00 | USD | None | 05/17/18 | ⊗ |
| 3 | 5 Test Conforma | 10455178 | Coupa Test | 110.00 | 0.00 | USD | None | 05/17/18 | ⊗ |
| 4 | 6 Test Conforma | 10455177 | Coupa Test | 178.54 | 0.00 | USD | None | 05/17/18 | ⊗ |
| 5 | 4 Test Conforma | 10458232 | Test2 | 9.99 | 0.00 | USD | None | 05/17/18 | ⊗ |
| 6 | 4 Test Conforma | 10458255 | Test2 | 9.99 | 0.00 | USD | None | 05/17/18 | ⊗ |

AUTOMATIC VIRTUAL PURCHASE CARD CHARGE RECONCILIATION AGAINST REQUISITION IN AN ONLINE PROCUREMENT SYSTEM

BENEFIT CLAIM

This application claims the benefit under 35 U.S.C. § 120 as a continuation of application Ser. No. 16/297,332, filed Mar. 8, 2019, which claims the benefit under 35 U.S.C. § 119(e) of provisional application 62/667,053, filed May 4, 2018, the entire contents of which are hereby incorporated by reference as if fully set forth herein. Applicant hereby rescinds any disclaimer of claim scope in the application(s) of which the benefit is claimed and advises the USPTO that the present claims may be broader than any application(s) of which the benefit is claimed.

TECHNICAL FIELD

One technical field of the present disclosure is digital electronic payment systems that process card purchases. Another technical field is online, real-time computer-implemented procurement systems that process requisitions, purchase orders, invoices, orders and the like.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Electronic procurement systems typically use computers to enforce an electronic document processing workflow in which a transaction begins with a requisition or purchase order transmitted from buyer to supplier, the supplier confirms the order, the supplier ships or delivers the goods or services, the supplier transmits an invoice, and the buyer electronically pays the invoice. While this process enforces a measure of control—the supplier isn't paid until the goods ship and an invoice is generated—it also requires the buyer to undertake the added steps of reviewing and paying an invoice long after the requisition or purchase order is created. In some situations, such as high-volume buying, this step becomes a source of delay and work that is perceived to be unnecessary. It requires extensive use of computers to retrieve and display documents, transmit e-mail messages or place phone calls to gather missing data, resolve problems, or send approvals and payment instructions.

Furthermore, when payment is by card, the traditional process requires reconciling card charge statements against invoices, purchase orders and requisitions. Typically, this is performed by manual review of online records and is labor-intensive and costly.

Moreover, traditional card payment reconciliation normally does not permit the buyer to determine the vendor that received payment. Often the vendor is represented only as the issuing bank of the card. This is because each card transaction results in a journal entry by the issuing bank rather than by the actual vendor.

All these issues result in needless use of network transmission bandwidth, memory and CPU cycles to create documents, transmit messages and perform reconciliation steps. The process is inefficient and there is a clear need for a way to reduce the use of these computing resources and save time in processing transactions via computer.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates an example system in which the techniques described may be implemented, according to an embodiment.

FIG. 3A illustrates an example method for improving computer processing efficiency, according to an embodiment.

FIGS. 3B-3C illustrate example subroutines, according to an embodiment.

FIG. 4 illustrates a graphical user interface screen display of example purchase order data for the purpose of illustrating data values and metadata that may be associated in the e-procurement system as part of a purchase order object, according to an embodiment.

FIG. 5 illustrates an example charge record display to illustrate data values that may be associated in a charge object, according to an embodiment, according to an embodiment.

FIG. 6 illustrates an example virtual card details display to illustrate data values that may be associated in a statement object, according to an embodiment.

FIG. 7 illustrates an example statement display showing charges to multiple different virtual payment cards, according to an embodiment.

DETAILED DESCRIPTION

Figure 2A:
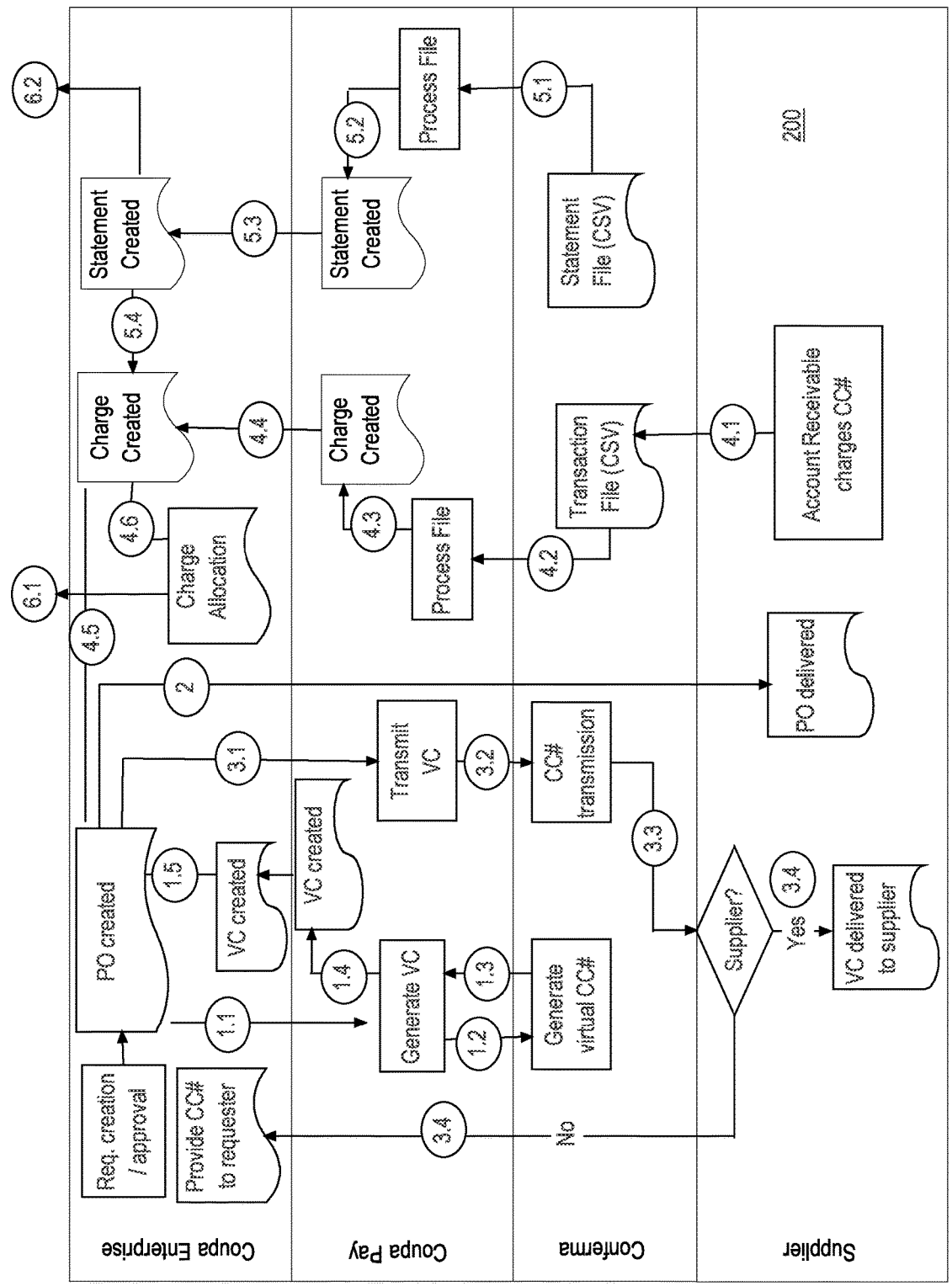
FIG. 2A illustrates an example flow diagram that may represent an algorithm to form the basis of programming a computer to implement automatic virtual purchase card charge reconciliation against requisition in an online procurement system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:
  1.0 GENERAL OVERVIEW
  2.0 STRUCTURAL OVERVIEW
  3.0 PROCEDURAL OVERVIEW
  4.0 GRAPHICAL USER INTERFACE IMPLEMENTATIONS
  5.0 BENEFITS OF CERTAIN EMBODIMENTS 6.0 HARDWARE OVERVIEW
7.0 OTHER ASPECTS OF DISCLOSURE

1.0 General Overview

In an embodiment, a programmed computer-implemented method allows enterprises to pay transactions using a virtual credit card at the time of an approved purchase order. The approach maintains corporate controls relating to requisitions and purchase orders. Furthermore, by computer input, users can add controls on virtual cards such as total spend limit or category or suppliers that can charge the virtual card number. The disclosed process eliminates the need for electronic invoicing.

The disclosed techniques also automate the accounting and reconciliation of virtual credit card charges. A particular line item in a card statement, representing a particular charge event, is automatically reconciled to the correct purchase order. Embodiments provide a triple linkage of POs (purchase orders) to charges as they happen to credit card statements, which typically are generated monthly.

The disclosed techniques also allow adding vendor level visibility to credit card transactions. Each charge represented in a card statement can be associated with the supplier that is identified in a corresponding PO. Therefore, a computer graphical user interface (GUI) can show vendor identification at any time, whereas most buyers are not able to see the true vendor in spend data on a credit card charge, as the vendor is typically just represented as the issuing bank.

In an embodiment, a computer-implemented method for improving computer processing efficiency, comprises associating, using a procurement computing device, purchase order data with virtual card data prior to transmitting the purchase order data, over a computer network, to a first external computing device. The method further comprises, in response to receiving, at an end of a first periodic interval, a first information feed over the computer network, performing a first routine, wherein the first routine comprises: processing, using the procurement computing device, the first information feed to generate charge data relating to a first event that occurred during the first periodic interval and is associated with the virtual card data, and electronically storing the charge data in a digital repository accessible by the procurement computing device, associating, using the procurement computing device, the charge data with the purchase order data. The method further comprises, in response to receiving, at an end of a second periodic interval that is longer than the first periodic interval, a second information feed over the computer network, performing a second routine, wherein the second routine comprises, processing, using the procurement computing device, the second information feed to generate statement data associated with at least the virtual card data, associating, using the procurement computing device, the statement data representing the first event with the charge data stored in the digital repository.

In an embodiment, the disclosed techniques result in use of fewer computational resources including fewer network messages, less memory and fewer CPU cycles, for all the reasons set forth in the preceding paragraphs.

Other features, aspects and embodiments will become apparent from the disclosure as a whole including the drawings and claims.

2.0 Structural Overview

FIG. 1 illustrates an example system in which the techniques described may be implemented according to an embodiment.

In the example of FIG. 1, a server computer 102, a buyer computer 114, and supplier computers 116, 118, 120 are communicatively coupled to a data communications network 122. The network 122 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 102, the buyer computer 114, and supplier computers 116, 118, 120, and other elements of the system 100 may each comprise an interface compatible with the network 122 and are programmed or configured to use standardized protocols for communication across the networks such as TCP/IP, Bluetooth, and higher-layer protocols such as HTTP, TLS, and the like.

The server computer 102 may be implemented using a server-class computer or other computers having one or more processor cores, co-processors, or other computers. The server computer 102 may be a physical server computer and/or a virtual server instance stored in a data center, such as through cloud computing.

The server computer 102 may be programmed or configured to store transaction data and analyze the transaction data in order to generate recommendations. The server computer 102 may be coupled to a data repository 106 that is configured for storing past transaction data 104, requisition data 110, PO data 112, virtual card data 113, charge data 115, and statement data 116. The server computer 102 may additionally receive information that is not specific to individual transactions, such as public contact information of suppliers, website URLs for suppliers, and catalogue information for suppliers.

The transactional data 104 may be used to generate recommendations, such as supplier improvement recommendations. The transactional data 104 includes data regarding transactions through one or more software platforms. The transactional data 104 includes data regarding past transactions and data generated from the past transactions. The transaction data 104 may include any of a buyer identifier, a supplier identifier, a buyer generated tag, product information, pricing information, a billing code, location data, a rating for a supplier of the transaction, event data, and any other data associated with the transactions. While transactions are generally described in terms of supplying of goods, a transaction may additionally comprise the purchase of services and/or a combination of goods and services.

Past transactions may include transaction data between a plurality of buyers and a plurality of suppliers. The past transactions may include a supplier ID which identifies the supplier in the transaction, a buyer ID which identifies the buyer in the transaction, an item ID which identifies at least one item purchased in the transaction, and additional transaction details. Additional transaction details may include additional data regarding the transaction, such as a tag for the transaction, a billing code for the purchaser, a number of items purchased, a price per unit of the items, identifiers of one or more other suppliers that bid against the supplier of the transaction, contact information for the supplier, and other transaction details.

In an embodiment, the server computer 102 may additionally store data separate from the transactions that are related to the transactions. For example, the server computer 102 may store supplier profiles that identify suppliers, contact information for the suppliers, win rate for the suppliers, past transactions of the suppliers, categorization data that categorizes items associated with transactions, discount threshold data, and any other data determined or generated by procurement management instructions 103, charge management instructions 107 and payment processing instructions 105 as further described.

Requisition data 110 comprises digitally stored data representing procurement requisitions. PO data 112 comprises digitally stored data representing purchase orders. Virtual card data 113 comprises digitally stored data representing a payment card. Charge data 115 comprises digitally stored data representing one or more charges to the payment card. Statement data 116 comprises digitally stored data representing payment card statements of completed charge transactions. Any such data may include data regarding buyer purchases from suppliers such as cost of items or commodities, quantity, and any subset of transaction data 104 related to buyer acquisitions of items or commodities.

In an embodiment, the server computer 102 is programmed with procurement management instructions 103, charge management instructions 107, and payment instructions 105. Other sets of instructions may be included to form a complete system such as an operating system, utility libraries, a presentation layer, database interface layer and so forth. In an embodiment, the procurement management instructions 103 are programmed to implement a digital electronic procurement management system that can accept requisition data, enforce workflows to transition requisitions to POs, transmit POs to suppliers, and manage supplier-buyer interaction via computer. A commercial example of an online e-procurement system that could be used is Coupa Enterprise, commercially available from Coupa Software Incorporated of San Mateo, Calif.

In an embodiment, the charge management instructions 107 are programmed for associating virtual card data with purchase orders, transmitting virtual card data for use in transactions, allocating charges to accounting events, interfacing with the payment processing instructions to manage charge creation and statement creation, and other functions as further described herein. The charge management instructions 107 may be integrated with the procurement management instructions 103 as part of a single e-procurement system, in some embodiments.

In an embodiment, the payment processing instructions 105 are programmed for generating virtual payment cards, transmitting virtual card data, processing card transaction files, processing statement files, creating and updating charge objects, creating and updating statement objects, and interfacing the procurement management instructions 103 and a virtual card issuer 124. In some embodiments, in keeping with sound software engineering principles of modularity and separation of function, the payment instructions 105 are implemented as a logically separate program, process or library in relation to the procurement management instructions 103.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer 102.

The computing devices such as the buyer computer 114 and supplier computers 116, 118, 120 may comprise a desktop computer, laptop computer, tablet computer, smartphone, or any other type of computing device that allows access to the server 102. The buyer computer 112 may be associated with one or more buyers. Each supplier computer 116, 118, 120 may be associated with one or more suppliers.

FIG. 1 depicts the server computer 102 as a distinct element for the purpose of illustrating a clear example. However, in other embodiments, more or fewer server computers may accomplish the functions described herein. Additionally, the server computer 102 may comprise a plurality of communicatively coupled server computers including a server computer for storing past transaction data.

A virtual card issuer 124 may be coupled to network 122 for purposes of interacting with the server computer 102 through an application programming interface (API) or other programmatic mechanism. In general, the virtual card issuer 124 typically is an entity independent of the entity that owns, operates or manages the server computer 102 and is programmed to issue virtual payment card numbers and securely process payment transactions. A commercial example of a virtual card issuer 124 is Conferma Ltd. of Cheshire, United Kingdom.

3.0 Procedural Overview

FIG. 2A illustrates an example flow diagram that may represent an algorithm to form the basis of programming a computer to implement automatic virtual purchase card charge reconciliation against requisition in an online procurement system, according to an embodiment. For example, the procurement management instructions 103, the charge management instructions 107, and the payment instructions 105 may be programmed according to FIG. 2A. FIG. 2A, and each other flow diagram of this disclosure, represents an algorithm or program that may be used or executed using the computer system of FIG. 1 to implement the functions that are described herein. FIG. 2A, and each other flow diagram of this disclosure, is illustrated and described at the same level of detail as used by persons of skill in the technical fields to which this disclosure relates for communicating among themselves about how to structure and execute computer programs to implement embodiments.

In general, FIG. 2A implements a process 200 in which the e-procurement system creates and manages charge objects. A charge object is a programmatic object created and managed in digital memory and represents a charge to a virtual card for particular goods or services associated with a requisition or purchase order. For accounting purposes, the charge object acts like an invoice, as it can be sent to an enterprise resource planning (ERP) system to create necessary journal entries but does not include all data that a typical invoice object includes.

Creating and digitally storing programmatic charge objects as supplier charges occur to virtual payment cards is a key innovation of the present disclosure. In response to receiving a daily transaction file from a virtual card issuer 124, the payment layer of an e-procurement system creates and stores a charge object to represent each supplier charge identified in the transaction file and associates the charge objects with existing POs or requisitions. This programmatic step permits later processing the credit card issuer's full monthly statement file and matching statement lines with charges and POs when the statement file arrives at the close of a revolving charge accounting period. Individual charges can be transmitted logically higher to ERP systems or accounting systems for journaling, without manual intervention. Consequently, the reconciliation of buyer credit card statements is fully automated, which has not been possible in prior approaches.

For purposes of describing a clear example, in FIG. 2A, the designation COUPA ENTERPRISE or "the e-procurement system" may refer to procurement instructions 103 and charge management instructions 107 in cooperation; COUPAPAY or "payment layer" in this disclosure may refer to payment instructions 105; CONFERMA may refer to virtual card issuer 124; and SUPPLIER may refer to any of the supplier computers 116, 118, 120. The following description is expressed in terms of functions, each of which is executed by computer according to the instructions that have been described. That is, each function is a computer operation that is intended to be executed by computer under control of the programmed instructions that have been described.

Referring first to the upper-left corner of FIG. 2A, in an embodiment, the process 200 of FIG. 2A starts with creation and/or approval of a purchase requisition. The requisition is created electronically in the e-procurement system and stored in digital data storage. It is capable of display in a GUI or web page of the e-procurement system and use in reports and other data processing. As part of a procurement workflow, a purchase order is created next and also digitally stored in the system, for example in data repository 106. At step 1.1 of FIG. 2A, creation of the purchase order triggers a request to generate a virtual payment card. In response, at step 1.2, the system signals the virtual card issuer 124 to create a virtual payment card.

In response, the virtual card issuer 124 internally creates a virtual payment card, typically represented by a unique card number and other metadata such as date of creation, credit limit, owner or user and other values. At step 1.3, the virtual card issuer 124 sends a reply message indicating that a new virtual payment card was successfully created. In response, at step 1.4, the e-procurement payment layer transmits a message logically upward in the e-procurement system indicating that the virtual payment card was successfully created. At step 1.5, metadata for the virtual payment card is associated or linked, via a pointer or other reference, to the purchase order.

At step 2, a copy of the purchase order, or data derived from the purchase order, is electronically transmitted to a supplier computer 116, 118, 120 of the supplier identified in the PO. This message effectively instructs the supplier to deliver the goods and services identified in the PO. Steps involved with actual manufacture, supply or delivery are outside the scope of this disclosure.

At step 3.1, the e-procurement system instructs the payment layer to transmit virtual card details to the supplier. At step 3.2, the payment layer requests the virtual card issuer 124 to transmit virtual card details to the supplier.

At step 3.3, the virtual card issuer 124 initiates transmission of a virtual card number to the supplier. Data stored at the virtual card issuer 124 specifies, for each supplier, whether card numbers are transmitted directly to the supplier or not. As indicated in the test labeled "card # go to supplier?" if such data permits transmitting a card number to the supplier, then at a first branch of step 3.4, the virtual card number for the buyer's specified virtual payment card is transmitted to the supplier. If the test is negative, then at a second branch of step 3.4, the card number is emailed or otherwise transmitted to the requester associated with the e-procurement system who prepared the original requisition. The requester then is responsible to provide card payment details to the supplier by other means, such as email, other secure data transfer, telefax or telephone.

At this point in the process, a PO has been created, a virtual payment card has been created that is associated with a bank account of the enterprise that is using the e-procurement system, and which the supplier can later charge to receive payment for goods or services, and the payment card details have been transmitted to the supplier. Consequently, the system has created and transmitted all data necessary for the supplier to be paid, and associated payment card data with the PO.

Assume at this point that the supplier properly ships goods or supplies services. At step 4.1, the supplier's accounts receivable department, or other authorized party, charges the card number that was received via step 3.4. The charge is effective to pay the supplier for the goods and services. The charge is processed through the virtual card issuer 124 and details of the charge enter a transaction file, which may be a comma-separated-values (CSV) data file, or any other form of data storage.

At step 4.2, the virtual card issuer 124 transmits the transaction file to the payment layer, with a message requesting the payment layer to process the transaction file or specifying that the transaction file is being delivered.

At step 4.3, the payment layer creates a charge object. The charge object is a programmatic object that is digitally created in memory using object-oriented programming and execution techniques. The charge object comprises data representing a particular card charge transaction as occurred at step 4.1 and reported at step 4.2.

At step 4.4, the payment layer notifies the e-procurement system that the charge object has been created and provides a copy, link or reference to the charge object. At step 4.5, the e-procurement system associates the charge object with the purchase order that was previously created. At step 4.6, the e-procurement system initiates a charge allocation operation, which at step 6.1 may comprise a callback to an enterprise resource planning (ERP) system or other external accounting system, to allocate the charge to the PO in a journal entry.

Steps 4.1, 4.2, 4.3, 4.4, 4.5, and 4.6 may be repeated any number of times within a card statement period with respect to different POs or charges of the same supplier or different suppliers. Each individual card charge that a supplier initiates to pay itself for goods or services associated with a PO results in executing the process of steps 4.1, 4.2, 4.3, 4.4, 4.5, and 4.6.

Upon the close of a revolving charge accounting period, typically monthly, the virtual card issuer 124 automatically generates and transmits a statement file to the payment layer at step 5.1. The statement file comprises digital records of each charge transaction that occurred for a particular card(s) in the preceding accounting period.

At step 5.2, the payment layer processes the file and creates a statement object. The statement object is a programmatic object that is digitally created in memory using object-oriented programming and execution techniques. The statement object comprises data representing the statement file that was created at step 5.1 and processed at step 5.2.

At step 5.3, the payment layer transmits a notification to the e-procurement system signaling that a statement object was created and providing a copy, link or reference to the statement object. At step 5.4, the e-procurement system is programmed to match data in the statement object to charge objects that are stored in memory and/or the data repository 106. At step 6.2, the e-procurement system initiates a statement reconciliation operation, which at step 6.1 may comprise a callback to an enterprise resource planning (ERP) system or other external accounting system, to allocate or associate statement line items to journal entries in the ERP system.

Figure 2B:
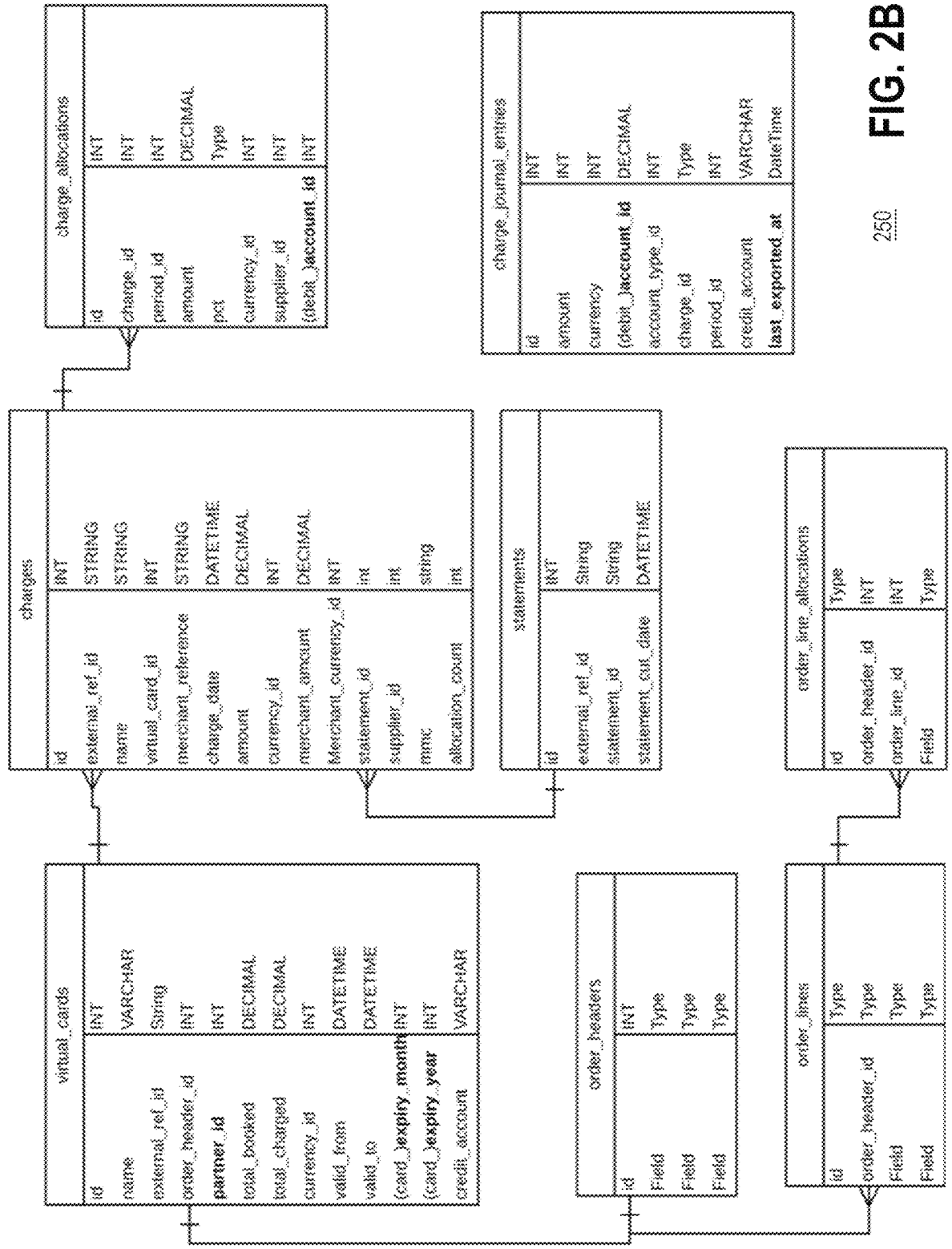
FIG. 2B illustrates an example data model that may be used to implement the programmatic objects that have been previously described, according to an embodiment.

FIG. 2B illustrates an example data model that may be used to implement the programmatic objects that have been previously described, according to an embodiment. In the example of FIG. 2B, a data model 250 indicates the relationships among the programmatic objects stored by the e-procurement system, illustrating programmatic links or data references between different objects or classes.

FIG. 3A illustrates an example method for improving efficiency in a procurement system by automatically forming digital data relationships that did not previously exist, according to an embodiment. FIG. 3A may be used as a basis to code method 300 as one or more computer programs or other software elements that a procurement computing device executes or hosts.

The method 300 begins at step 305, in which a procurement computing device associates purchase order data with virtual card data prior to transmitting the purchase order data, over a computer network, to a first external computing device. In an embodiment, the association of the purchase order data with the virtual card data prior to the purchase order data being transmitted to the first external computing device facilitates elimination of subsequent transmission, over the computer network, of any invoice data relating to the purchase order data after the transmission of the purchase order data to the first external computing device. An example first external computing device is a supplier computing device.

The purchase order data is created from a purchase requisition that has been approved by the procurement computing device and is stored in a digital repository accessible by the procurement computing device. In an embodiment, the creation of the purchase order data triggers a request to generate a virtual card. In an embodiment, the virtual card is generated by an entity independent from the entity that owns, operates or manages the procurement computing device. In an embodiment, this independent entity is a virtual card issuer that owns, operates, or manages a card issuer computing device. The virtual card is associated with a unique card number and includes metadata such as date of creation, credit limit, owner or user and other values. In an embodiment, some values may be controls provided by the owner or user prior to the generation of the virtual card, as conditions to prevent improper use of the unique card number. The procurement computing device stores at least the metadata relating to the virtual card as the virtual card data and associates or links the purchase order data with the virtual card data. In an embodiment, the virtual card data may become invalid under the conditions specified by the owner or user.

At step 310, in response to receiving, at an end of a first periodic interval, a first information feed over the computer network, the procurement computing device performs a first subroutine. In an embodiment, the card issuer computing device generates and transmits to the procurement computing device the first information feed on, for example, a daily basis. In an embodiment, the first information feed includes a transaction file, which may be a comma-separated-values data file, or any other form of data storage, which includes information relating to charge transactions. FIG. 3B illustrates an example first subroutine, according to an embodiment.

Referring now to FIG. 3B, at step 325, the procurement computing device processes the first information feed to generate charge data relating to a first event that occurred during the first periodic interval and that is associated with the virtual card data. The first event is a charge event or transaction on the virtual card, wherein the charge event had been effective to pay a supplier in accordance with the purchase order data. In an embodiment, upon the charge event occurring, details of the charge event were entered in the transaction file by the card issuer computing device. The procurement computing device generates from the first information feed charge data relating to the charge event and stores the charge data in the digital repository accessible by the procurement computing device.

At step 330, the procurement computing device associates the charge data with the purchase order data stored in the digital repository. In an embodiment, the procurement computing device may transmit the charge data relating to the first event to a second computing device. An example second external computing device is an enterprise resource planning (ERP) computing device or an accounting computing device configured to allocate the charge data to the purchase order data in a journal entry.

Referring back to FIG. 3A, at step 315, in response to receiving, at an end of a second periodic interval that is longer than the first periodic interval, a second information feed over the computer network, the procurement computing device performs a second subroutine. In an embodiment, the card issuer computing device generates and transmits to the procurement computing device the second information feed on, for example, a monthly basis (or some other accounting cycle). In an embodiment, the second information feed includes a statement file, which comprises digital records of all charge events or transactions that occurred for at least the virtual card in the preceding accounting period. FIG. 3C illustrates an example second subroutine, according to an embodiment.

Referring now to FIG. 3C, at step 355, the procurement computing device processes the second information feed to generate statement data associated with at least the virtual card data. In an embodiment, the statement data is generated from a line item, relating to the first event, in the statement file. The procurement computing device stores the statement data in the digital repository accessible by the procurement computing device.

At step 360, the procurement computing device associates the statement data representing the first event with the charge data stored in the digital repository. This association results in an automatic reconciliation of the statement data representing the first event to the purchase order data. The automatic reconciliation may be based on a triple link of the purchase order data to the charge data to the statement data representing the first event. In an embodiment, the procurement computing device may transmit at least the statement data representing the first event to the second external computing device to allocate the statement data to the journal entry. In an embodiment, the frequency of transmission of the charge data to the second external computing device is greater than the frequency of transmission of statement data to the second external computing device.

In an embodiment, the method 300 facilitates elimination of subsequent transmission, over the computer network, of any invoice data relating to the purchase order data. For example, the supplier computing device receives all data necessary for the supplier to be paid prior to delivery of goods or service. In an embodiment, the data necessary for the supplier to be paid are received at or about the time the supplier computing device receives the purchase order data. The supplier may then later charge to receive payment of goods or services without generating an invoice that would otherwise be generated after delivery of goods or services in prior approaches.

In an embodiment, the charge data generated by the procurement computing device includes a sufficient amount of information for the ERP computing device or the accounting computing device to create necessary journal entries. The charge data thus may comprise a portion but not all of data from a typical invoice. As such, the charge data is less complex than the invoice data.

4.0 Graphical User Interface Implementations

FIG. 4 illustrates a graphical user interface screen display of example purchase order data for the purpose of illustrating data values and metadata that may be associated in the e-procurement system as part of a purchase order object, according to an embodiment. For example, a purchase order object may include data values and metadata identifying the supplier, the requester, the virtual card associated with the purchase order, and other information.

FIG. 5 illustrates an example charge record display to illustrate data values that may be associated in a charge object, according to an embodiment. For example, the charge record display may include data values identifying the payment associated with a charge, such as the virtual payment card used in the transaction, the amount charged to the virtual payment card, the transaction or charge date, merchant reference associated with the supplier, and other information.

FIG. 6 illustrates an example virtual payment card details display to illustrate data values that may be associated in a statement object, according to an embodiment. For example, the virtual payment card details display may include data values identifying each charge made on the virtual payment card, such as the amount charged to the virtual payment card, merchant reference associated with the supplier, and other information.

FIG. 7 illustrates an example statement display showing charges to multiple different virtual payment cards, according to an embodiment. For example, the statement in FIG. 7 shows five (5) line items, with IDs 2-6. Each line item includes data values identifying a particular event or transaction in an accounting cycle, such as the virtual payment card associated with the transaction.

5.0 Benefits of Certain Embodiments

Using these techniques, a programmed computer-implemented method allows enterprises to pay transactions using a virtual credit card at the time of an approved purchase order. The approach maintains corporate controls relating to requisitions and purchase orders. Furthermore, by computer input, users can add controls on virtual cards such as total spend limit or category or suppliers that can charge the virtual card number. The disclosed process eliminates the need for electronic invoicing. The disclosed techniques also automate the accounting and reconciliation of virtual credit card charges. A particular line item in a card statement, representing a particular charge event, is automatically reconciled to the correct purchase order. Embodiments provide a triple linkage of POs to charges as they happen to credit card statements, which typically are generated monthly. The disclosed techniques also allow adding vendor level visibility to credit card transactions. Each charge represented in a card statement can be associated with the supplier that is identified in a corresponding PO. Therefore, a computer graphical user interface (GUI) can show vendor identification at any time, whereas most buyers are not able to see the true vendor in spend data on a credit card charge, as the vendor is typically just represented as the issuing bank. Consequently, the disclosed techniques result in use of fewer computational resources including fewer network messages, less memory and fewer CPU cycles, for all the reasons set forth in the preceding paragraphs.

6.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
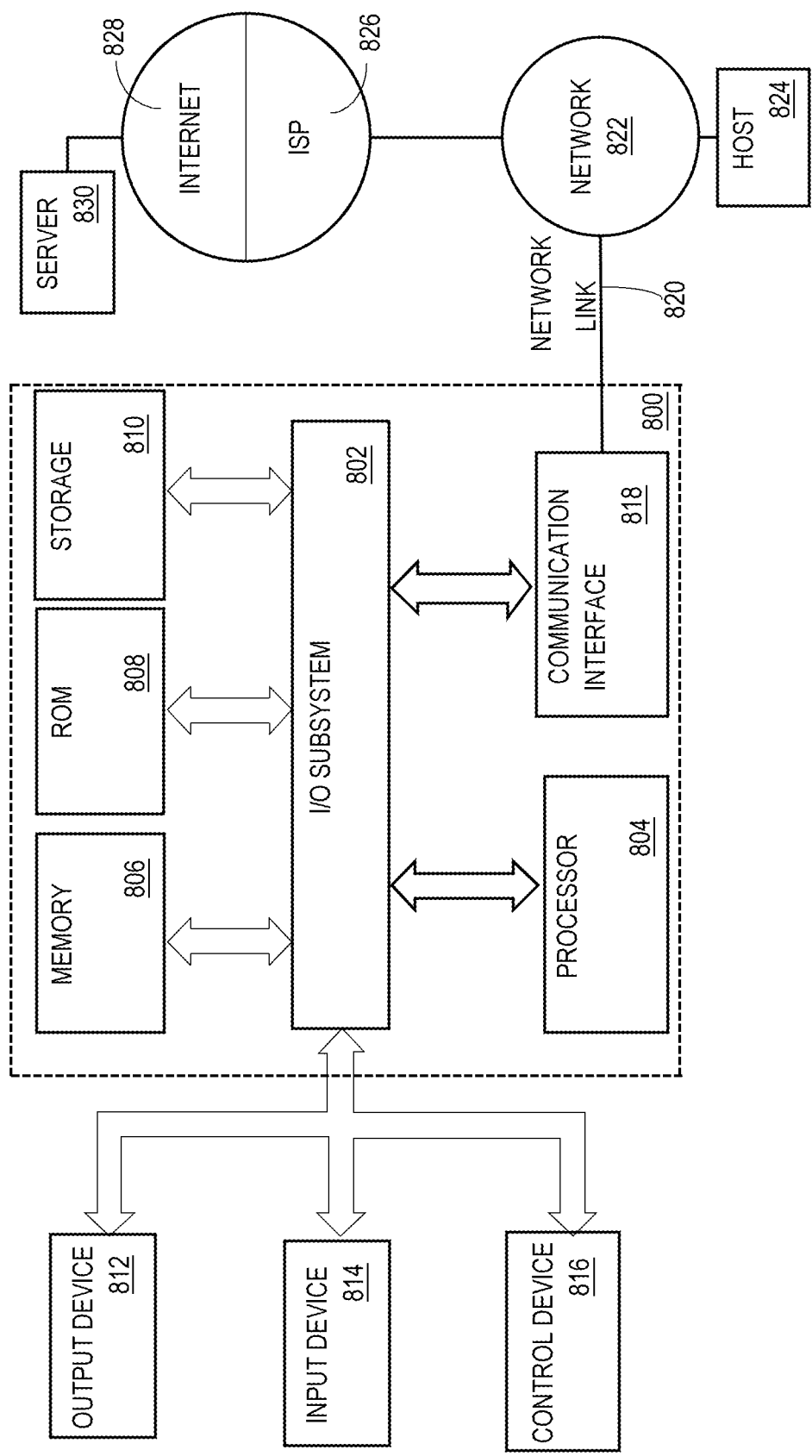
FIG. 8 is a block diagram that illustrates an example computer system with which an embodiment may be implemented, according to an embodiment.

FIG. 8 is a block diagram that illustrates an example computer system with which an embodiment may be implemented, according to an embodiment. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanism(s) for communicating information and/or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display 812. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an internet of things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host 824 or server 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to bus 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server 830 may form elements of a distributed computing system that includes other computers, a processing cluster, server farm or other organization of computers that cooperate to perform tasks or execute applications or services. Server 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, Internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method for modifying channels of communication over a data communications network to improve an electronic procurement system, comprising:
    receiving, at a procurement computing device, purchase order data that is generated before a charge settlement that is associated with the purchase order data;
    in response to receiving the purchase order data, generating a request for generation of a purchase-specific virtual payment card;
    receiving, at the procurement computing device, the purchase-specific virtual payment card that has been generated based on the request;
    associating, using the procurement computing device, the purchase order data with the virtual payment card prior to transmitting the purchase order data, over a computer network, to a first external computing device;
    in response to receiving, at an end of a first periodic interval, a first information feed over the computer network, executing a first routine comprising:
        processing, using the procurement computing device, the first information feed to generate charge data relating to a first event that occurred during the first periodic interval and that is associated with the virtual payment card, and electronically storing the charge data in a digital repository accessible by the procurement computing device, the charge data comprising a portion but not all of the invoice data; and
        associating, using the procurement computing device, the charge data with the purchase order data;
    in response to receiving, at an end of a second periodic interval that is longer than the first periodic interval, a second information feed over the computer network, executing a second routine comprising:
        processing, using the procurement computing device, the second information feed to generate statement data associated with at least the virtual payment card; and
        associating, using the procurement computing device, the statement data representing the first event with the charge data previously generated during the first periodic interval and stored in the digital repository;
    automatically reconciling, in the electronic procurement system, the statement data representing the first event with the purchase order data generated before the associated charge settlement based on the execution of the first routine followed by the execution of the second routine;
    identifying, using a link of the purchase order data to the charge data to the statement data representing the first event, a supplier or vendor from the purchase order data; and
    displaying, in a graphical user interface, the supplier or vendor that has been identified from the purchase order data along with the statement data representing the first event.

2. The computer-implemented method of claim 1, further comprising triggering a request to generate the virtual payment card in response to the creation of the purchase order data.

3. The computer-implemented method of claim 2, wherein the virtual payment card becomes invalid under conditions that are specified by a user prior to the generation of the virtual payment card.

4. The computer-implemented method of claim 1, further comprising receiving the first information feed before receiving the second information feed.

5. The computer-implemented method of claim 1, further comprising executing programmed instructions to cause an external accounting system to allocate one or more statement line items to one or more journal entries in the external accounting system.

6. The computer-implemented method of claim 1, the first routine further comprising transmitting the charge data relating to the first event to a second external computing device, the second routine further comprising transmitting at least the statement data representing the first event to the second external computing device, a first frequency of transmission of charge data to the second external computing device being greater than a second frequency of transmission of statement data to the second external computing device.

7. The computer-implemented method of claim 1, the external accounting system comprising an enterprise resource planning (ERP) system.

8. One or more non-transitory computer-readable media storing instructions which, when processed by one or more processors, cause the one or more processors to execute modifying channels of communication over a data communications network to improve an electronic procurement system by:
 receiving purchase order data that is generated before a charge settlement that is associated with the purchase order data;
 in response to receiving the purchase order data, generating a request for generation of a purchase-specific virtual payment card;
 receiving the purchase-specific virtual payment card that has been generated based on the request;
 associating the purchase order data with the virtual payment card prior to transmitting the purchase order data, over a computer network, to a first external computing device;
 in response to receiving, at an end of a first periodic interval, a first information feed over the computer network, executing a first routine comprising:
  processing the first information feed to generate charge data relating to a first event that occurred during the first periodic interval and that is associated with the virtual payment card, and electronically storing the charge data in a digital repository, the charge data comprising a portion but not all of the invoice data; and
  associating the charge data with the purchase order data;
 in response to receiving, at an end of a second periodic interval that is longer than the first periodic interval, a second information feed over the computer network, executing a second routine comprising:
  processing the second information feed to generate statement data associated with at least the virtual payment card; and
  associating the statement data representing the first event with the charge data previously generated during the first periodic interval and stored in the digital repository;
 automatically reconciling, in the electronic procurement system, the statement data representing the first event with the purchase order data generated before the associated charge settlement based on the execution of the first routine followed by the execution of the second routine;
 identifying, using a link of the purchase order data to the charge data to the statement data representing the first event, a supplier or vendor from the purchase order data; and
 displaying, in a graphical user interface, the supplier or vendor that has been identified from the purchase order data along with the statement data representing the first event.

9. The one or more non-transitory computer-readable media of claim 8, the instructions being further operable when executed to cause triggering a request to generate the virtual payment card in response to the creation of the purchase order data.

10. The one or more non-transitory computer-readable media of claim 9, wherein the virtual payment card becomes invalid under conditions that are specified by a user prior to the generation of the virtual payment card.

11. The one or more non-transitory computer-readable media of claim 8, the instructions being further operable when executed to cause receiving the first information feed before receiving the second information feed.

12. The one or more non-transitory computer-readable media of claim 8, the first routine further comprising transmitting the charge data relating to the first event to a second external computing device, the second routine further comprising transmitting at least the statement data representing the first event to the second external computing device, a first frequency of transmission of charge data to the second external computing device being greater than a second frequency of transmission of statement data to the second external computing device.

13. The one or more non-transitory computer-readable media of claim 8, the instructions being further operable when executed to cause executing programmed instructions to cause an external accounting system to allocate one or more statement line items to one or more journal entries in the external accounting system.

14. The one or more non-transitory computer-readable media of claim 13, the external accounting system comprising an enterprise resource planning (ERP) system.

15. A computer system configured to execute modifying channels of communication over a data communications network to improve an electronic procurement system, the computer system comprising:
 one or more processors; and
 one or more memories communicatively coupled to the one or more processors and storing instructions which, when processed by the one or more processors of the computer system, cause:
 receiving purchase order data that is generated before a charge settlement that is associated with the purchase order data;
 in response to receiving the purchase order data, generating a request for generation of a purchase-specific virtual payment card;
 receiving the purchase-specific virtual payment card that has been generated based on the request;
 associating the purchase order data with the virtual payment card prior to transmitting the purchase order data, over a computer network, to a first external computing device;
 in response to receiving, at an end of a first periodic interval, a first information feed over the computer network, executing a first routine comprising:
  processing the first information feed to generate charge data relating to a first event that occurred during the first periodic interval and that is associated with the virtual payment card, and electronically storing the charge data in a digital repository, the charge data comprising a portion but not all of the invoice data; and associating the charge data with the purchase order data;

in response to receiving, at an end of a second periodic interval that is longer than the first periodic interval, a second information feed over the computer network, executing a second routine comprising:

processing the second information feed to generate statement data associated with at least the virtual payment card; and associating the statement data representing the first event with the charge data previously generated during the first periodic interval and stored in the digital repository;

automatically reconciling, in the electronic procurement system, the statement data representing the first event with the purchase order data generated before the associated charge settlement based on the execution of the first routine followed by the execution of the second routine;

identifying, using a link of the purchase order data to the charge data to the statement data representing the first event, a supplier or vendor from the purchase order data; and displaying, in a graphical user interface, the supplier or vendor that has been identified from the purchase order data along with the statement data representing the first event.

16. The computer system of claim 15, the instructions being further operable when executed to cause triggering a request to generate the virtual payment card.

17. The computer system of claim 16, wherein the virtual payment card becomes invalid under conditions that are specified by a user prior to the generation of the virtual payment card.

18. The computer system of claim 15, the instructions being further operable when executed to cause receiving the first information feed before receiving the second information feed.

19. The computer system of claim 15, the first routine further comprising transmitting the charge data relating to the first event to a second external computing device, the second routine further comprising transmitting at least the statement data representing the first event to the second external computing device, a first frequency of transmission of charge data to the second external computing device being greater than a second frequency of transmission of statement data to the second external computing device.

20. The computer system of claim 15, the instructions being further operable when executed to cause executing programmed instructions to cause an enterprise resource planning (ERP) system to allocate one or more statement line items to one or more journal entries in the ERP system.

* * * * *